(12) United States Patent
Patterson et al.

(10) Patent No.: US 10,632,559 B2
(45) Date of Patent: Apr. 28, 2020

(54) INDEXING DRIVE ROLL CARRIER SYSTEM AND METHOD

(71) Applicant: Illinois Tool Works Inc., Glenview, IL (US)

(72) Inventors: Jon Michael Patterson, Appleton, WI (US); Thomas Don Lahti, Combined Locks, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 281 days.

(21) Appl. No.: 15/483,951

(22) Filed: Apr. 10, 2017

(65) Prior Publication Data
US 2017/0209951 A1    Jul. 27, 2017

Related U.S. Application Data

(63) Continuation of application No. 13/939,949, filed on Jul. 11, 2013, now Pat. No. 9,616,516.

(51) Int. Cl.
*B23K 9/28* (2006.01)
*B23K 9/133* (2006.01)
(Continued)

(52) U.S. Cl.
CPC ............ *B23K 9/1336* (2013.01); *B23K 9/173* (2013.01); *B65H 51/10* (2013.01); *B65H 51/32* (2013.01);
(Continued)

(58) Field of Classification Search
CPC ........ B65H 51/10; B65H 51/30; B65H 51/32; B65H 2701/36; B23K 9/1043; B23K 9/12;
(Continued)

(56) References Cited

U.S. PATENT DOCUMENTS 1,873,326 A    8/1932 Ratigan
3,055,591 A    9/1962 Shepard
(Continued)

FOREIGN PATENT DOCUMENTS

CN    1478628    3/2004
CN    1478630    3/2004
(Continued)

OTHER PUBLICATIONS

International Search Report from PCT application No. PCT/US2013/045280, dated Oct. 18, 2013, 9 pgs.
(Continued)

*Primary Examiner* — Hung D Nguyen
(74) *Attorney, Agent, or Firm* — McAndrews, Held & Malloy, Ltd.

(57) ABSTRACT

A drive roll carrier includes a hub coupled to and extending axially from a gear along a rotational axis, an engagement feature coupled to and extending axially from the gear, and a retainer disposed about the hub. The gear is rotatable via a wire feed motor. The engagement feature is configured to engage the drive roll and urge rotation of the drive roll as the gear is rotated. The retainer includes an alignment feature configured to receive the drive roll. The retainer may be selectively locked into one of a first position relative to the hub and a second position relative to the hub. The alignment feature and the engagement feature are aligned in the first position and not aligned in the second position, and the retainer may be transitioned between the first and second positions without being translated along the hub in a direction of the rotational axis.

20 Claims, 5 Drawing Sheets

(51) Int. Cl.
*B65H 51/32* (2006.01)
*B65H 51/10* (2006.01)
*B23K 9/173* (2006.01)
B23K 9/10 (2006.01)
B23K 9/12 (2006.01)

(52) U.S. Cl.
CPC ..... *B65H 2701/36* (2013.01); *Y10T 29/49895* (2015.01)

(58) Field of Classification Search
CPC ...... B23K 9/124; B23K 9/133; B23K 9/1333; B23K 9/1336; B23K 9/16; B23K 9/173; B23K 9/28; B23K 9/282; B23K 9/295; B23K 9/32; Y10T 29/49895
USPC ........ 219/136, 137.2, 137.31, 137.7, 137.71; 226/168, 174, 176, 177, 182, 186, 187
See application file for complete search history.

(56) References Cited

U.S. PATENT DOCUMENTS

| | | | |
|---|---|---|---|
| 3,062,569 | A | 11/1962 | Westermeier |
| 3,199,644 | A | 8/1965 | Clapp |
| 3,203,268 | A | 8/1965 | Manoni |
| 3,734,369 | A | 5/1973 | Johnson |
| 4,527,037 | A | 7/1985 | Johnson |
| 4,703,156 | A | 10/1987 | Hayes |
| 4,902,162 | A | 2/1990 | Watt |
| 4,954,690 | A | 9/1990 | Kensrue |
| 5,249,760 | A | 10/1993 | Morimoto |
| 5,410,126 | A | 4/1995 | Miller |
| 5,816,466 | A | 10/1998 | Seufer |
| 6,286,748 | B1 | 9/2001 | Cooper |
| 6,388,234 | B1 | 5/2002 | Collins |
| 6,427,894 | B1 | 8/2002 | Blank |
| 6,536,644 | B2 | 3/2003 | Plow |
| 6,557,742 | B1 | 5/2003 | Bobeczko |
| 6,568,578 | B1 | 5/2003 | Kensrue |
| 7,244,909 | B2 | 7/2007 | Kensrue |
| 7,301,124 | B2 | 11/2007 | Kaufman |
| 7,374,074 | B2 | 5/2008 | Matiash |
| 7,615,723 | B2 | 11/2009 | Matiash |
| 7,767,934 | B2 | 8/2010 | Christopher |
| 7,977,604 | B2 | 7/2011 | Ertmer |
| 2002/0130153 | A1 | 9/2002 | Plow |
| 2003/0015510 | A1 | 1/2003 | Wakeman |
| 2005/0016976 | A1 | 1/2005 | Belfiore |
| 2005/0040202 | A1 | 2/2005 | Kerekes |
| 2005/0224486 | A1 | 10/2005 | Matiash |
| 2006/0219683 | A1 | 10/2006 | Kensrue |
| 2006/0278623 | A1 | 12/2006 | Christopher |
| 2008/0035624 | A1 | 2/2008 | Ertmer |
| 2009/0277890 | A1 | 11/2009 | Leiteritz |
| 2011/0220628 | A1 | 9/2011 | Mehn |
| 2012/0152924 | A1 | 6/2012 | Christopher |
| 2012/0152926 | A1 | 6/2012 | Matiash |
| 2012/0248084 | A1 | 10/2012 | Romenesko |
| 2013/0035192 | A1 | 2/2013 | Hayashi |
| 2013/0334190 | A1 | 12/2013 | Garvey |
| 2014/0263255 | A1* | 9/2014 | Garvey ................. B23K 9/124 219/137.71 |
| 2015/0014383 | A1 | 1/2015 | Patterson |

FOREIGN PATENT DOCUMENTS

| | | |
|---|---|---|
| CN | 201881037 | 6/2011 |
| CN | 202963749 | 6/2013 |
| DE | 20113852 | 11/2001 |
| EP | 1577245 | 9/2005 |
| EP | 2476500 | 7/2012 |
| GB | 1093736 | 12/1967 |
| WO | 0128728 A2 | 4/2001 |
| WO | 03022501 | 1/2003 |
| WO | 2008018960 | 2/2008 |
| WO | 2008018961 | 2/2008 |
| WO | 2013033849 | 3/2013 |

OTHER PUBLICATIONS

International Search Report from PCT application No. PCT/US2014/017224, dated Aug. 12, 2014, 8 pgs.

International Search Report from PCT application No. PCT/US2014/045166, dated Nov. 5, 2014, 10 pgs.

* cited by examiner

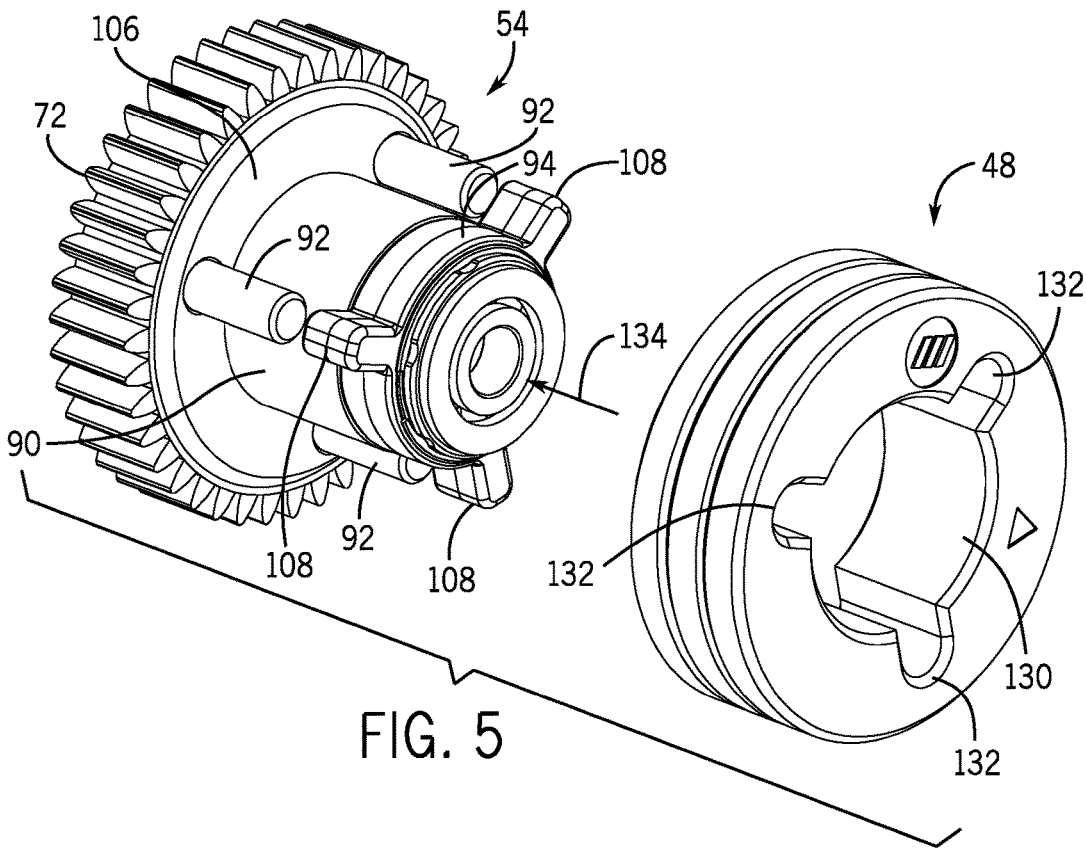
FIG. 5
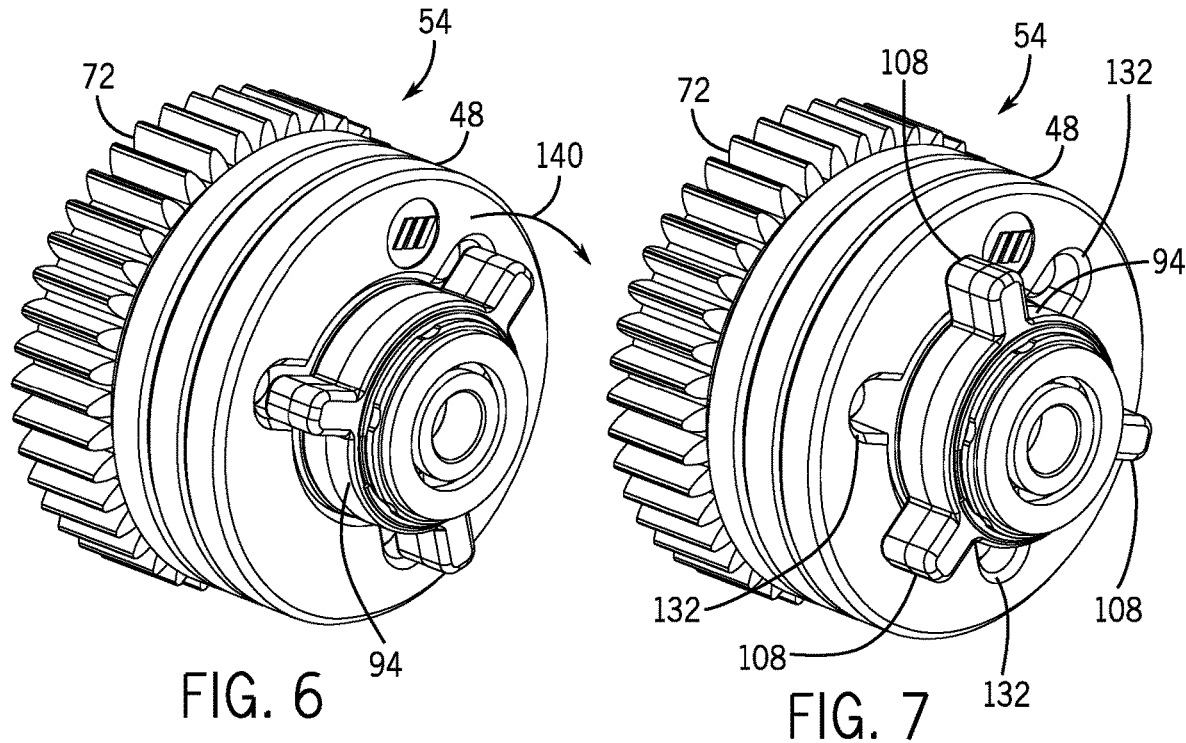
FIG. 6
FIG. 7

INDEXING DRIVE ROLL CARRIER SYSTEM AND METHOD

CROSS-REFERENCE TO RELATED APPLICATION

This application is a Continuation Patent Application of U.S. Non-Provisional application Ser. No. 13/939,949, entitled "INDEXING DRIVE ROLL CARRIER SYSTEM AND METHOD," filed Jul. 11, 2013, which is herein incorporated by reference in its entirety.

BACKGROUND

The invention relates generally to welding systems and, more particularly, to a drive roll carrier for use in a welding wire feeder.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at a desired time. For example, gas metal arc welding (GMAW) typically relies on a wire feeder to ensure a proper wire feed reaches a welding torch.

Such wire feeders facilitate the feeding of welding wire from a wire spool, through a pair of feed rolls, to the welding torch at a desired wire feed rate. At least one of the feed rolls, a drive roll, is driven by a motor to move the welding wire through the wire feeder. A drive roll carrier receives and holds the drive roll, while the motor rotates the drive roll carrier to turn the drive roll. The drive roll carrier can receive different drive rolls configured to move different types of welding wire through the wire feeder. However, existing drive roll carriers are often cumbersome assemblies, and can be difficult to replace if any part of the drive roll wears out.

BRIEF DESCRIPTION

In a first embodiment, a wire feeder includes a drive roll carrier. The drive roll carrier includes a hub coupled to and extending from a gear along a rotational axis, an engagement feature coupled to and extending from the gear, and a retainer disposed about the hub. The gear is configured to be rotated via a motor of the welding wire feeder. The engagement feature is configured to engage a drive roll and to urge rotation of the drive roll as the gear is rotated. The retainer includes an alignment feature configured to receive the drive roll onto the drive roll carrier. The retainer is configured to be selectively locked into one of a first position relative to the hub and a second position relative to the hub, where the alignment feature and the engagement feature are aligned in the first position and not aligned in the second position. The retainer is configured to be transitioned between the first and second positions without being translated along the hub in a direction of the rotational axis.

In another embodiment, a drive roll carrier includes a hub coupled to and extending axially from a gear along a rotational axis, an engagement feature coupled to and extending axially from the gear, and a retainer disposed about the hub. The gear is configured to be rotated via a wire feed motor. The engagement feature is configured to engage the drive roll and to urge rotation of the drive roll as the gear is rotated. The retainer includes an alignment feature configured to receive the drive roll onto the drive roll carrier. The retainer is configured to be selectively locked into one of a first position relative to the hub and a second position relative to the hub, where the alignment feature and the engagement feature are aligned in the first position and not aligned in the second position. The retainer is configured to be transitioned between the first and second positions without being translated along the hub in a direction of the rotational axis.

In a further embodiment, a method includes receiving a drive roll via an alignment feature of a retainer disposed about a hub of a drive roll carrier. The retainer is rotatable relative to the hub and configured to be selectively locked into a first position relative to the hub and into a second position relative to the hub. The method also includes receiving the drive roll onto an engagement feature of the drive roll carrier from the alignment feature when the retainer is disposed in the first position relative to the hub. The engagement feature is configured to urge rotation of the drive roll when a motor rotates the drive roll carrier. In addition, the method includes securing the drive roll on the engagement feature when the retainer is disposed in the second position relative to the hub. The retainer is configured to be transitioned between the first and second positions without being translated along the hub in the direction of the rotational axis.

DRAWINGS

These and other features, aspects, and advantages of the present embodiments will become better understood when the following detailed description is read with reference to the accompanying drawings in which like characters represent like parts throughout the drawings, wherein:

FIG. 5 is a perspective view of an embodiment of the drive roll carrier of FIG. 4 receiving a drive roll;

FIG. 6 is a perspective view of an embodiment of the drive roll carrier of FIG. 4 with the drive roll disposed on the drive roll carrier;

FIG. 7 is a perspective view of an embodiment of the drive roll carrier of FIG. 4 with the drive roll secured to the drive roll carrier;

DETAILED DESCRIPTION

Presently disclosed embodiments are directed to systems and methods for receiving and securing drive rolls in a welding wire feeder. Specifically, a wire feeder may be equipped with a drive roll carrier configured to receive a drive roll and to urge rotation of the drive roll as the drive roll carrier is rotated by a motor. The drive roll may be subsequently removed from the drive roll carrier and replaced with a different drive roll in a relatively easy manner. The drive roll carrier includes a gear coupled to a hub, and the hub extends axially (or longitudinally) outward from the gear along a rotational axis of the gear. The drive roll carrier also includes one or more engagement features designed to receive and engage the drive roll, in order to rotate the drive roll as the gear is rotated by the drive motor. A retainer rests on the hub, and is designed to be moved between a first and second position relative to the hub. Specifically, the retainer can be rotated about the hub such that one or more alignment features of the retainer become aligned with the engagement features (e.g., in the first position) or misaligned with the engagement features (e.g., in the second position). The retainer and hub may be equipped with indexing features for locking the retainer in place in either of the first and second positions.

To change the position of the retainer, an operator may impart a rotational force onto the retainer to rotate the retainer about the hub and into the next indexed position. The retainer may receive the drive roll via the alignment feature, and the drive roll may pass between the alignment feature of the retainer and the engagement feature of the drive roll carrier when the retainer is in the first position such that the two parts are aligned. After being moved to the engagement feature, the drive roll may be secured to the drive roll carrier as the retainer is moved from the first position to the second position. In this nonaligned position, the drive roll cannot move from the engagement feature to the alignment feature and off of the drive roll carrier.

The retainer may be rotated between the first and second positions about the hub without being moved in a direction of the rotational axis (e.g., longitudinal axis of the hub). A retaining ring may hold the retainer in place along the longitudinal axis of the hub. The retaining ring may rest on an outside edge of the drive roll carrier, making it relatively easy to access components (e.g., retainer) of the drive roll carrier if they become worn. Instead of having to remove the entire drive roll carrier from the wire feeder and rebuilding or replacing the drive roll carrier, a single replacement retainer may be installed onto the drive roll carrier while the drive roll carrier is disposed in the wire feeder.

Figure 1:
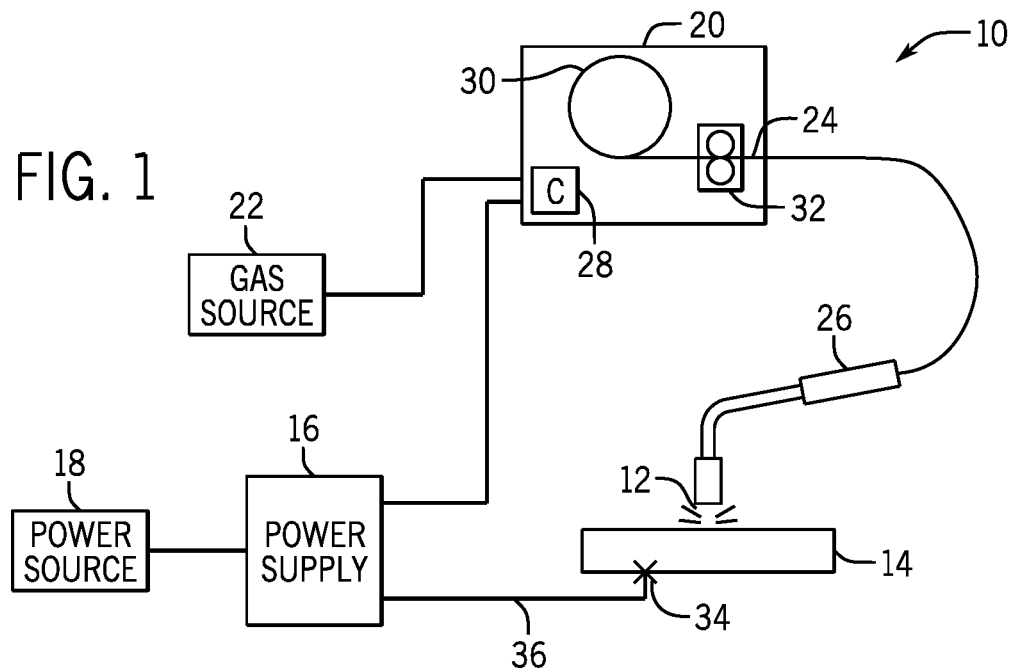
FIG. 1 is a schematic representation of an embodiment of a welding system utilizing a wire feeder that may include an indexing drive roll carrier.

Turning now to the drawings, FIG. 1 is a schematic representation of an embodiment of a welding system 10 that may include an indexing drive roll carrier in accordance with present techniques. The welding system 10 is designed to produce a welding arc 12 on a work piece 14. The welding arc 12 may be of any type of weld, and may be oriented in any desired manner, including metal inert gas (MIG), metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding wire 24 is fed through the welding torch 26 to the welding arc 12, molten by the welding arc 12, and deposited on the work piece 14.

The wire feeder 20 will typically include control circuitry 28, which regulates the feed of the welding wire 24 from a spool 30, and commands the output of the power supply 16. The spool 30 will contain a length of welding wire 24 that is consumed during the welding operation. The welding wire 24 is advanced by a wire drive assembly 32, typically through the use of an electric motor under control of the control circuitry 28. The wire drive assembly 32 may utilize an indexing drive roll carrier to support feed rolls used to move the welding wire 24 through the wire feeder 20. The work piece 14 is coupled to the power supply 16 by a clamp 34 connected to a work cable 36 to complete an electrical circuit when the welding arc 12 is established between the welding torch 26 and the work piece 14.

Placement of the welding torch 26 at a location proximate to the work piece 14 allows electrical current, which is provided by the power supply 16 and routed to the welding torch 26, to arc from the welding torch 26 to the work piece 14. As described above, this arcing completes an electrical circuit that includes the power supply 16, the welding torch 26, the work piece 14, and the work cable 36. Particularly, in operation, electrical current passes from the power supply 16, to the welding torch 26, to the work piece 14, which is typically connected back to the power supply 16 via the work cable 36. The arcing generates a relatively large amount of heat that causes part of the work piece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Figure 2:
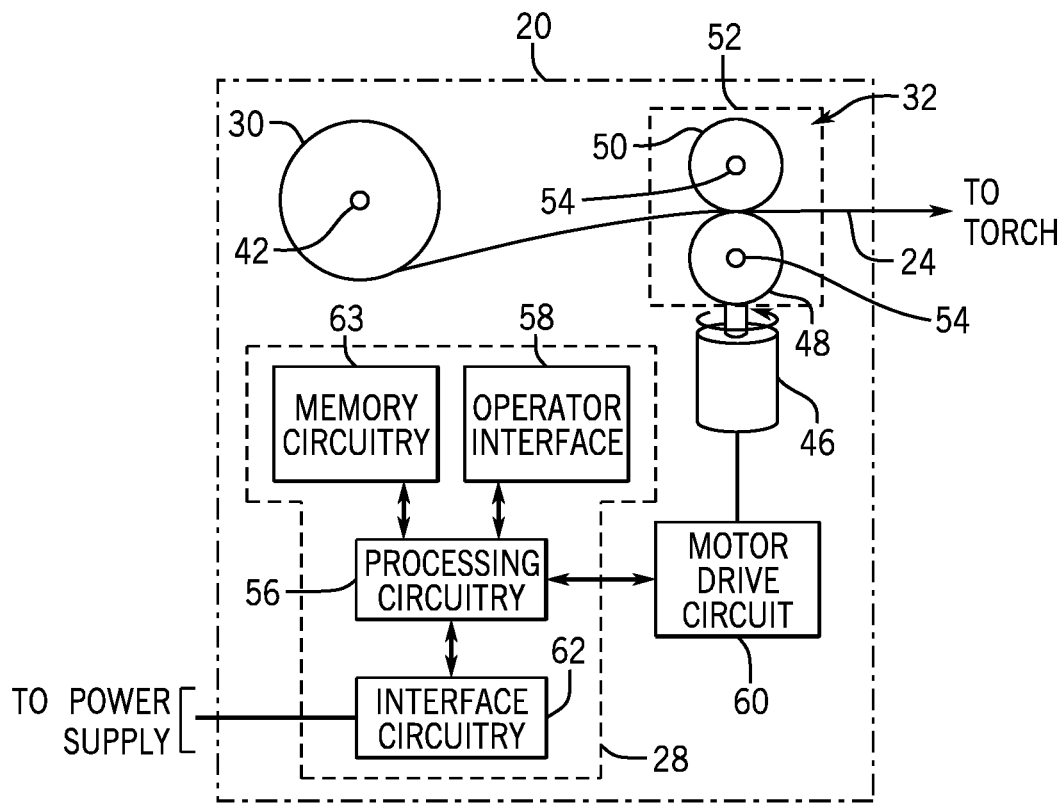
FIG. 2 is a block diagram of an embodiment of certain components of the wire feeder of FIG. 1.

FIG. 2 is a block diagram of an embodiment of certain components of the wire feeder 20 of FIG. 1. In certain embodiments, the welding wire 24 is supplied from the spool 30, which may be mounted via a spool mount 42 within the wire feeder 20. The wire drive assembly 32 facilitates progressive feeding of the welding wire 24 from the spool 30 to the welding torch 26 at a desired rate for the welding application. A motor 46 is provided that engages with two feed rolls 48 and 50 to push the welding wire 24 from the wire feeder 20 toward the welding torch 26. In practice, one of the feed rolls (i.e., a drive roll) 48 is mechanically coupled to the motor 46 and is rotated by the motor 46 to drive the welding wire 24 from the wire feeder 20, while the mating feed roll (i.e., an idler roll) 50 is biased toward the welding wire 24 to maintain contact between the two feed rolls 48 and 50 and the welding wire 24. The feed rolls 48 and 50 may be supported on a wire drive assembly housing 52 of the wire feeder 20. Both the drive roll 48 and the idler roll 50 are configured to rotate with respect to the wire drive assembly housing 52. The illustrated embodiment shows one pair of feed rolls 48 and 50, although the wire feeder 20 may include multiple pairs of such feed rolls in certain embodiments. One or both of the feed rolls 48 and 50 may be disposed on drive roll carriers 54. The drive roll carriers 54, as discussed in detail below, may receive, align, and secure the feed rolls 48 and 50 within the wire drive assembly 32.

In addition to mechanical components, the wire feeder 20 also includes the control circuitry 28 for controlling the wire feed speed of the welding wire 24 through the wire feeder 20, among other things. In certain embodiments, processing circuitry 56 is coupled to an operator interface 58 on the wire feeder 20 that allows selection of one or more welding parameters, for example, wire feed speed. The operator interface 58 may also allow for selection of such weld parameters as the welding process, the type of welding wire 24 utilized, current, voltage or power settings, and so forth. The processing circuitry 56 communicates with the motor 46 via a motor drive circuit 60, allowing control of wire feed speeds in accordance with operator selections. Additionally, the processing circuitry 56 permits these settings to be fed back to the power supply 16 via interface circuitry 62 and/or stored by appropriate memory circuitry 63 for later use. The control circuitry 28 within the wire feeder 20 may also regulate the flow of shielding gas from the gas source 22 to the welding torch 26. In general, such shielding gas is provided at the time of welding, and may be turned on immediately preceding welding and for a short time following welding.

Figure 3:
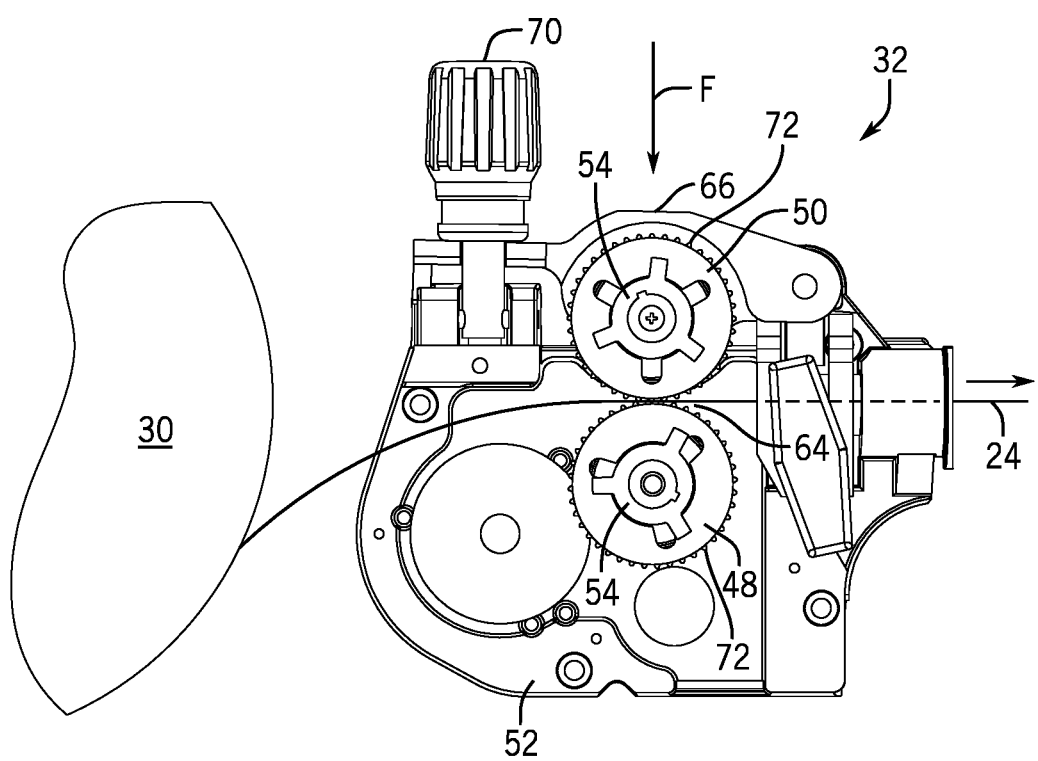
FIG. 3 is a front view of an embodiment of certain components of the wire feeder of FIG. 1, including a wire drive assembly feeding welding wire from a spool to a welding application.

FIG. 3 is a front view of an embodiment of certain components of the wire feeder 20 of FIG. 1, including the drive assembly 32 feeding welding wire 24 from the spool 30 to a welding application. As previously mentioned, the idler feed roll 50 engages with the welding wire 24, applying a downward force F to the welding wire 24 for feeding the welding wire 24 between the feed rolls 48 and 50. This downward force F generates traction between the feed rolls 48 and 50 and the welding wire 24, effectively holding the welding wire 24 in alignment through a welding wire feed region 64 located between the feed rolls 48 and 50. As illustrated, the idler roll 50 is mounted on a clamp arm 66, which may be forced down by a tensioner 70. The tensioner 70 may apply a desired amount of compressive force F to the clamp arm 66, pushing the idler roll 50 toward the drive roll 48. Adjustment of the compressive force F applied by the tensioner 70 may alter the size of the wire feed region 64, and the desired compressive force F may be determined based on the diameter and material properties of the welding wire 24 (e.g., steel versus aluminum welding wire).

As mentioned above, one or both of the feed rolls 48 and 50 may be held within the wire drive assembly 32 via drive roll carriers 54. These drive roll carriers 54 may allow for relatively easy insertion and removal of the feed rolls 48 and 50 from the wire drive assembly 32. In some embodiments, these feed rolls 48 and 50 may be changed out occasionally. That is, the feed rolls 48 and 50 may be replaced or exchanged for ones configured to accommodate different sizes, types, and materials of welding wire 24. The drive roll carriers 54 may include gears 72, as illustrated, for syncing the rotation of the feed rolls 48 and 50. Even if the feed rolls 48 and 50 themselves do not touch, the gears 72 upon which they are mounted may be engaged, such that the motion imparted from the motor 46 to the drive roll 48 is also transferred to the corresponding idler roll 50. In some embodiments, multiple sets of feed rolls 48 and 50 may be arranged on corresponding drive roll carriers 54 that are geared together via a gear assembly that receives mechanical power from a single motor 46.

It should be noted that, in the illustrated embodiment, both of the feed rolls 48 and 50 are supported on the drive roll carriers 54. However, in other embodiments, the drive roll 48 may be supported on the drive roll carrier 54, while the idler roll 50 may be a static roller that rotates in response to the rotation of the nearby drive roll 48. For the remainder of the application, the drive roll carrier 54 will be described with reference to the drive roll 48. However, it should be understood that the present techniques may be used to support any number of feed rolls in use within the wire feeder 20, including drive rolls 48 and idler rolls 50.

Figure 4:
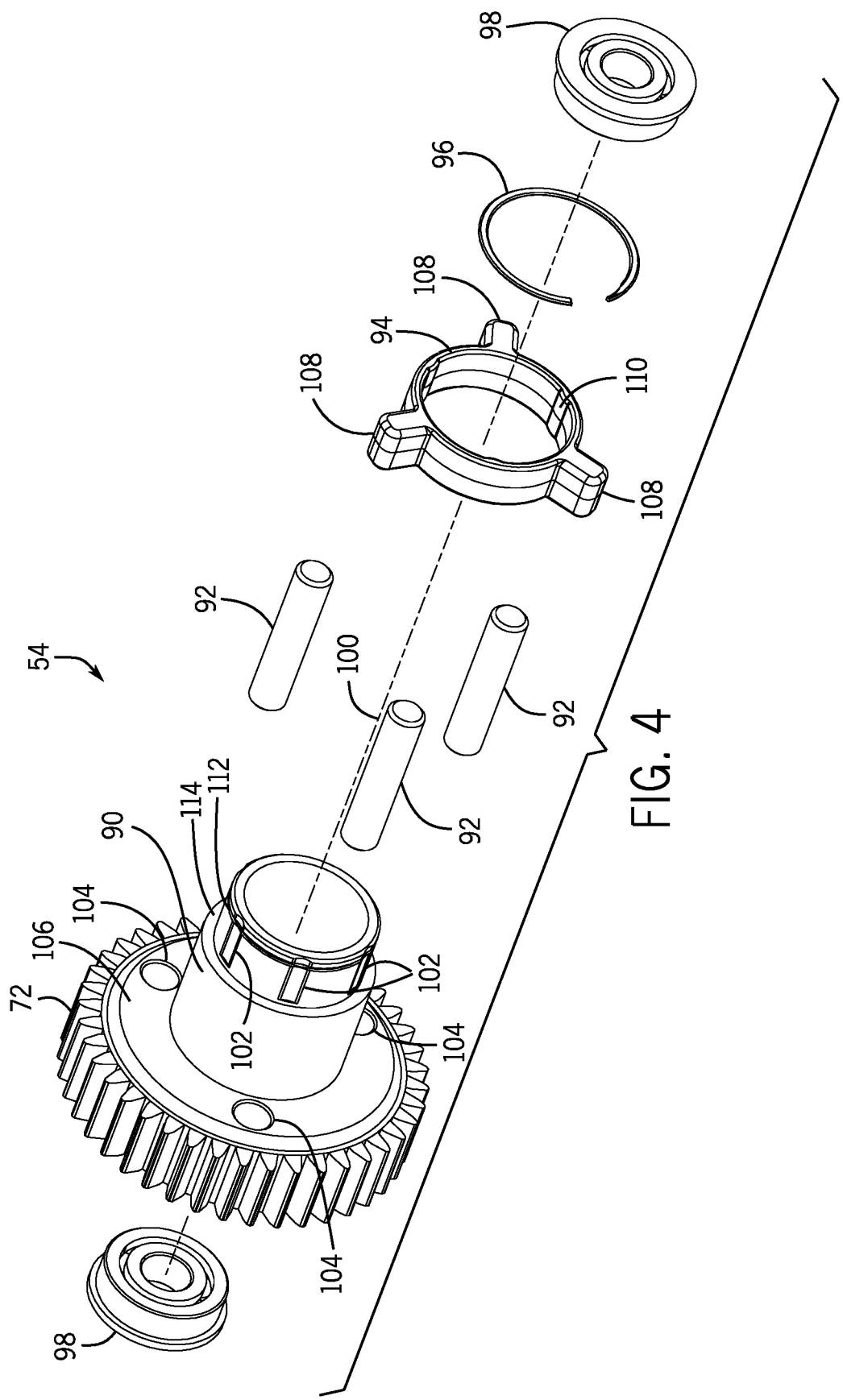
FIG. 4 is an exploded perspective view of an embodiment of a drive roll carrier for use in the wire feeder of FIG. 1.

FIG. 4 is an exploded perspective view of an embodiment of the drive roll carrier 54 used in the wire feeder 20. In the illustrated embodiment, the drive roll carrier 54 includes the gear 72, a hub 90, drive roll engagement features 92, a retainer 94, a retaining ring 96, and two flange bearings 98.

The gear 72 is configured to be rotated via the motor 46 of the wire drive assembly 32, as noted above. This rotation occurs about a rotational axis 100 of the gear 72. The hub 90 may be coupled to and extending axially (or longitudinally) from the gear 72 in a direction of the rotational axis 100. That is, the rotational axis 100 of the gear 72 may also represent a longitudinal axis of the hub 90. In certain embodiments, the gear 72 and the hub 90 may be separately constructed and later combined to form the gear 72 with integrated hub 90. In the illustrated embodiment, the hub 90 is integral with the gear 72. In such an embodiment, the gear 72 and the hub 90 may be constructed from a single piece of material, such as powder metal. In embodiments where the gear 72 and hub 90 are one piece, the center bore of the piece may be machined very accurately to form a bore that is concentric with the outer diameter of the gear 72. As a result, the drive roll 48 may be rotated more precisely with the gear 72, applying consistent pressure to the welding wire 24 and maintaining a consistent wire feed speed.

In the illustrated embodiment, the hub 90 includes indexing features 102 for locking the retainer 94 into different positions relative to the hub 90. In the illustrated embodiment, there are six indexing features 102 arranged circumferentially (e.g., at approximately every sixty degrees) around the hub 90. The indexing features 102 may be semi-cylindrical grooves formed along an outer circumference of the hub 90. The grooves may extend in an axial (or longitudinal) direction along the outer circumference of the hub 90. Such grooves or other indexing features 102 may be machined into the hub 90. Other numbers and types of indexing features 102 may exist as well. For example, instead of being substantially semi-cylindrically shaped as illustrated in FIG. 4, the indexing features 102 may instead be substantially semi-spherically shaped.

The engagement features 92 are configured to engage the drive roll 48 and to urge rotation of the drive roll 48 as the gear 72 is rotated by the motor 46. The engagement features 92 are dowel pins in the illustrated embodiment, although other types of engagement features may be used as well. These engagement features 92 may be coupled to the gear 72, extending axially (or longitudinally) outward from the gear 72 in a direction substantially parallel (e.g., within less than approximately 1-2 degrees) to the rotational axis 100. The gear 72 may include apertures 104 drilled through an outward facing surface 106 of the gear 72, and these apertures 104 may be configured to receive the pins, or some other type of engagement features 92. Although illustrated in FIG. 4 as having 3 engagement features 92, in other embodiments, there may be any desirable number (e.g., 1, 2, 4, 5, 6, or more) of the engagement features 92.

The retainer 94 is configured to be disposed around the hub 90 for retaining the drive roll 48 onto the drive roll carrier 54. The retainer 94 may include one or more alignment features that can be brought into or out of alignment with the engagement features 92. In the illustrated embodiment, these alignment features include three lobes 108 extending radially outward from the retainer 94. These lobes 108 are located approximately every 120 degrees about the outer circumference of the retainer 94, just as the engagement features 92 are configured to be disposed every 120 degrees around the hub 90. In this manner, all three of the lobes 108 may be brought into alignment with the engagement features 92 at the same time.

In addition, the retainer 94 includes one or more indexing features 110 configured to interface with the indexing features 102 of the hub 90. The indexing features 102 and 110 together may allow for locking the retainer 94 into different positions relative to the hub 90. In the illustrated embodiment, there are three indexing features 110 arranged circumferentially (e.g., at approximately every 120 degrees) around the retainer 94. The indexing features 110 may be semi-cylindrical detents formed along an inner circumference of the retainer 94. The semi-cylindrical detents may extend in an axial (or longitudinal) direction along the inner circumference of the retainer 94. Other types of complementary indexing features 102 and 110 may exist as well. For example, in some embodiments, the indexing features 102 and 110 may include semi-spherical indentations and semi-spherical detents, respectively.

The drive roll carrier 54 may include any desired number and arrangement of indexing features 102 and 100 and lobes 108. For example, in some embodiments, the number of lobes 108 and indexing features 110 may be, in general, half as many as the number of indexing features 102 (e.g., 3 lobes 108, 3 indexing features 110, and 6 indexing features 102, or 4 lobes 108, 4 indexing features 110, and 8 indexing features 102, etc.). In the illustrated embodiment, each set of the indexing features 102, the indexing features 110, and the lobes 108 are arranged circumferentially around the hub 90 and the retainer 94, at constant angles relative to each other. Other numbers and arrangements of complementary indexing features 102 and 110 may exist as well. In certain embodiments, the retainer 94 may be injection molded to include all of these features.

In present embodiments, the drive roll carrier 54 is configured to facilitate loading and securing of the drive roll 48 onto the drive roll carrier 54. Specifically, the retainer 94 may be movable between a first position where the lobes 108 are aligned with the engagement features 92 and a second position where the lobes 108 are not aligned with the engagement features 92 (e.g., moved approximately 60 degrees out of alignment from the engagement features 92). To move the retainer 94 between these positions relative to the engagement features 92, the retainer 94 may be rotated about hub 90 such that the indexing feature 110 of the retainer 94 moves from interfacing with one indexing feature 102 to a subsequent indexing feature 102 of the hub 90. This movement of the retainer 94 relative to the hub 90 may be accomplished without moving the retainer 94 in a direction substantially parallel to the rotational axis 100. That is, the retainer 94 is not moved along the length or longitudinal axis of the hub 90 when being moved between different indexed positions.

In some embodiments, the indexing features 102 and 110 may be configured to secure the retainer 94 in the first position (e.g., an indexing position), but not into the second position. That is, when an operator desires to insert or remove the drive roll 48 relative to the engagement features 92, the operator may exert a user-initiated force to rotate the retainer 94 about the hub 90 until the retainer 94 becomes secured, via the indexing features 102 and 110, in the indexed position with the lobes 108 aligned with the engagement features 92. When the operator desires to lock the drive roll 48 in place on the drive roll carrier 54, the operator may simply rotate the retainer 94 such that the indexing features 102 and 110 are no longer matched up.

The retaining ring 96 is a retaining element configured to maintain the retainer 94 in a relatively constant axial (or longitudinal) position along the length of the hub 90 throughout use of the drive roll carrier 54. The hub 90 may be constructed with a circumferential groove 112 for receiving the retaining ring 96. In the illustrated embodiment, the retainer 94 is held between the retaining ring 96 and an abutting surface 114 of the hub 90. The retainer 94 may then be rotated relative to the hub 90, effectively sandwiched between the abutting surface 114 and the retaining ring 96 disposed in the groove 112. In this way, the retaining ring 96 may block the retainer 94 from moving axially (or longitudinally) along the hub 90 in a direction of the rotational axis 100. Other mechanical arrangements may be used to arrest movement of the retainer 94 along the axial (or longitudinal) length of the hub 90. The flange bearings 98 may be press fit to one or both sides of the drive roll carrier 54, as shown, to complete the assembly. Other embodiments may utilize different types of retaining elements (e.g., a snap ring, etc.) to prevent movement of the retainer 94 axially along the hub 90.

The drive roll carrier 54 may be relatively simple to repair if an issue is encountered. Specifically, if the retainer 94 wears out, the retainer 94 may be removed and a new retainer 94 may be installed onto the drive roll carrier 54. The retaining ring 96 is located along an outward facing surface of the drive roll carrier 54, exterior to the hub 90 and to the retainer 94. This makes the retaining ring 96 easily accessible to an operator. Removal of the retainer 94 may be accomplished without removing any other component of the drive roll carrier 54 besides the retaining ring 96. In addition, the retaining ring 96 and the retainer 94 may be removed from the drive roll carrier 54 while the gear 72 is positioned in the wire drive assembly 32. This may be particularly helpful in embodiments where the gear 72 may be located on an opposite side of the drive assembly housing 52 as the retainer 94. In addition, the different parts of the drive roll carrier 54 may be individually disassembled and replaced without requiring replacement of the entire drive roll carrier 54. Thus, the presently disclosed drive roll carrier 54 may be relatively simple and cost effective to repair compared to drive roll carriers that include complicated internal assemblies.

FIGS. 5-7 illustrate the fully assembled drive roll carrier 54 receiving, holding, and securing the drive roll 48 so that the drive roll 48 may be rotated as the drive roll carrier 54 is rotated. FIG. 5 is a perspective view of an embodiment of the drive roll carrier 54 receiving the drive roll 48. The illustrated drive roll 48 includes a bore 130 with three slots 132 protruding radially outward from the bore 130. As illustrated, the slots 132 may be circumferentially spaced at approximately every 120 degrees about the inner circumference of the bore 130. When the drive roll 48 is positioned on the drive roll carrier 54, the engagement features 92 may engage the slots 132 to urge rotation of the drive roll 48 as the drive roll carrier 54 is rotated. The drive roll 48 may be shaped differently in other embodiments.

In FIG. 5, the drive roll carrier 54 is positioned for receiving the drive roll 48. More specifically, the retainer 94 is positioned about the hub 90 such that the lobes 108 of the retainer 94 are aligned with the engagement features 92 of the drive roll carrier 54. An operator may insert the drive roll 48 onto the drive roll carrier 54, as shown by arrow 134. During insertion, the slots 132 are aligned with both the lobes 108 and the engagement features 92 of the drive roll carrier 54. From the illustrated position, the drive roll carrier 54 may receive the drive roll 48 via the lobes 108. The lobes 108 may be aligned with the engagement features 92 such that the drive roll 48 can be transitioned from resting on the lobes 108 to resting on the engagement features 92 and abutting the surface 106 of the gear 72.

Once the drive roll 48 is positioned with the slots 132 resting on the engagement features 92, as shown in FIG. 6, the retainer 94 may be transitioned from this first position to a second position. In the first position, the indexing features 102 and 110 have locked the retainer 94 in place relative to the hub 90 such that the lobes 108 are aligned with the engagement features 92. Once the drive roll 48 is positioned on the engagement features 92, however, it may be desirable to secure the drive roll 48 so that it does not move axially (or longitudinally) with respect to the drive roll carrier 54. Thus, the retainer 94 may be rotated, as shown by an arrow 140, to the next indexing point relative to the hub 90, in order to secure the drive roll 48 onto the drive roll carrier 54. As noted above, the retainer 94 may be repositioned via rotation about the hub 90, without being translated in an axial (or longitudinal) direction along the length of the hub 90.

The drive roll carrier 54 may be configured such that the retainer 94 can be transitioned between the indexing positions only in response to an external force. The term "external force" refers to a force that is not generated by components of the wire feeder 20. For example, the external force may be applied by an operator pushing on one or more of the lobes 108 to urge rotation (as shown by the arrow 140) of the retainer 94.

FIG. 7 shows the drive roll carrier 54 positioned such that the drive roll 48 is secured onto the drive roll carrier 54. The retainer 94 is disposed in the second position relative to the hub 90 such that the lobes 108 of the retainer 94 are not aligned with the engagement features 92, which are engaged with the slots 132 of the drive roll 48. In the second position, the indexing features 102 and 110 have locked the retainer 94 in place relative to the hub 90 such that the lobes 108 are in a staggered (or non-aligned) position relative the engagement features 92. Thus, the drive roll 48 cannot slide axially (or longitudinally) off of the drive roll carrier 54, and the drive roll 48 is securely engaged by the drive roll carrier 54. If an operator desires to remove the drive roll 48, the operator may turn the retainer 94 back to the prior indexing position, or to another indexing position where the lobes 108 are aligned with the engagement features 92.

Figure 8:
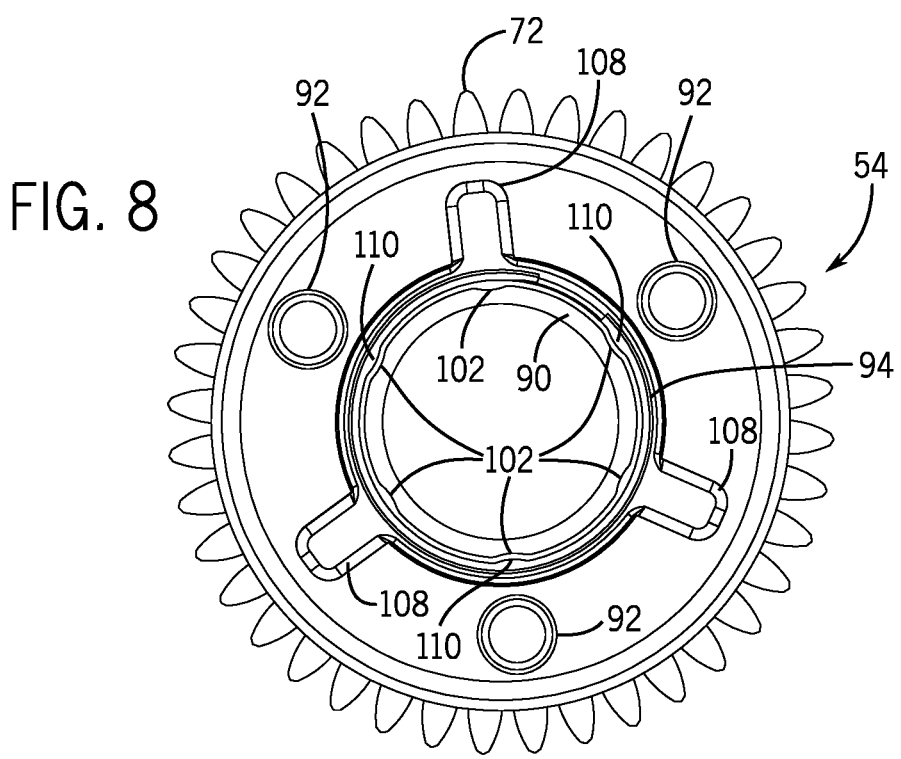
FIG. 8 is a front view of an embodiment of the drive roll carrier of FIG. 4.

FIG. 8 is a front view of the drive roll carrier 54 with the retainer 94 positioned such that the lobes 108 are out of alignment with the engagement features 92. FIG. 8 has been simplified to focus on the interface between the indexing features 102 and 110 of the hub 90 and the retainer 94, respectively. In the illustrated embodiment, the indexing features 102 of the hub 90 include semi-cylindrical grooves, and the indexing features 110 of the retainer 94 include semi-cylindrical detents designed to catch within the grooves of the hub 90. In other embodiments, the indexing features 102 of the hub 90 may include semi-spherical indentations, and the indexing features 110 of the retainer 94 may include semi-spherical detents.

There are six indexing features 102 illustrated on the hub 90, while there are only three complementary indexing features 110 illustrated on the retainer 94. Since there are also three engagement features 92, every other indexing position may bring the lobes 108 of the retainer 94 into alignment with the engagement features 92. That is, from the illustrated position, the retainer 94 may be rotated about the rotational axis 100 (in either direction), and the next indexing position (e.g., a position in which the indexing features 102 and 110 interface) will align the lobes 108 with the engagement features 92. Similarly, the retainer 94 may be rotated (in either direction) from this new position, and the next indexing position will lock the retainer 94 in place such that the lobes 108 and the engagement features 92 are not aligned.

It may be desirable for the drive roll carrier 54 to be dimensioned such that the retainer 94 is not able to move from one indexed position to another on its own. Moreover, the retainer 94 and the hub 90 may be dimensioned such that the retainer 94 is movable between the indexed positions only in response to an external force imparted on the retainer 94, such as by an operator pushing one or more of the lobes 108. To accommodate this, an inner diameter of the retainer 94 may be approximately the same size as, or slightly larger than, an outer diameter of the hub 90. For example, the inner diameter of the retainer 94 may be within approximately 0.5 mm of the outer diameter of the hub 90. In some embodiments, the inner diameter of the retainer 94 may be constructed to approximately the same size of the outer diameter of the hub 90, but machine tolerances and/or the material properties of the retainer 94 may enable the retainer 94 to fit over the hub 90. The retainer 94 may be dimensioned such that the force it takes to rotate the retainer 94 is high enough that the retainer 94 does not rotate on its own, and low enough to make it relatively easy for an operator to intentionally rotate the retainer 94. Throughout use, the external force needed to rotate the retainer 94 may decrease slightly as the indexing features 110 become warn down.

In the illustrated embodiment, the indexing features 110 of the retainer 94 are convex detents that extend toward the hub 90. In addition, the illustrated complementary indexing features 102 of the hub 90 are concave grooves extending into the hub 90. In such embodiments, the convex indexing feature 110 may be dimensioned to be relatively smaller than the concave indexing feature 102 configured to receive the convex indexing feature 110. In this way, the concave feature may fully capture the convex feature in order to lock the retainer 94 into a desired position. Once the convex detent (e.g., indexing feature 110) is captured in one of the concave grooves (e.g., indexing feature 102), the retainer 94 may be locked into this position until an external force is applied to move the retainer 94. The convex detent may be dimensioned to extend far enough outward to be received into the concave groove. However, the convex detent may not extend so far outward that the retainer 94 catches against the hub 90 when rotated between the indexing features 102. The specific yield strength of the material used to construct the convex feature may be considered when determining this desired dimension.

Several variations of the complementary indexing features 102 and 110 may exist in order to lock the retainer 94 into a desired position relative to the hub 90. For example, the indexing features 102 of the hub 90 may include a detent while the corresponding indexing features 110 of the retainer 94 may include grooves. The number of indexing features 102 and 110 may be different as well. For example, the retainer 94 may include the same number of indexing features 110 as the hub 90 in some embodiments. In order for the retainer 94 to be locked into and moved out of at least one indexed position (i.e., aligned position), there may be one or more indexing features 102 and one or more complementary indexing features 110. In order for the retainer 94 to be movable between and locked into at least two positions (aligned and not aligned with the engagement features 92), there may be two or more indexing features 102 and two or more complementary indexing features 110. As in the illustrated embodiment, there may be more of the concave features (e.g., indexing features 102) than there are convex features (e.g., indexing features 110). Although evenly spaced about the outer circumference of the hub 90, the indexing features 102 may be arranged at any desired angles relative to each other around the hub 90, and these angles do not have to be equal. Similarly, the indexing features 110 may be arranged at any desired angles (equal or unequal) relative to each other around the retainer 94. However, as noted above, the indexing features 102 and 110 are configured to interface such that the retainer 94 may be locked into at least one position where the lobes 108 are aligned with the engagement features 92, and into at least one position where the lobes 108 are not aligned with the engagement feature 92.

Figure 9:
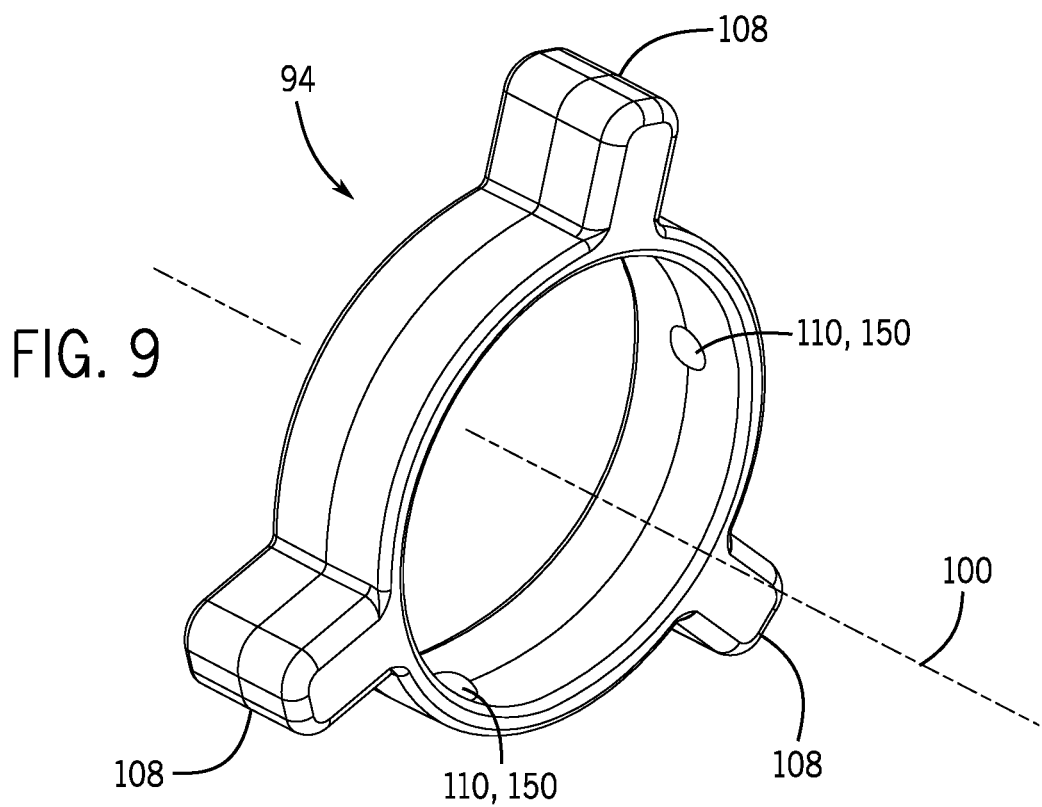
FIG. 9 is a perspective view of an embodiment of a retainer that may be part of the drive roll carrier of FIG. 4.

In addition, the type of detents and complementary features may be different in other embodiments. For example, FIG. 9 is a perspective view of an embodiment of the retainer 94. In this particular embodiment, the indexing features 110 of the retainer 94 are semi-spherical ball detents 150, as opposed to the semi-cylindrical detents in the retainer 94 of FIG. 4. The complementary indexing features 102 of the hub 90 may include semi-cylindrical grooves (discussed above), semi-spherical indentations, or a combination of both. In some embodiments, semi-cylindrical grooves may be useful for loading the illustrated retainer 94 onto the hub 90, since the grooves extend out to the edge of the hub 90 onto which the retainer 94 is received during initial assembly. Any desirable numbers, arrangements, and types of complementary indexing features 102 and 110 may be used for selectively locking the retainer 94 into different positions relative to the hub 90 for loading, unloading, and securing the drive roll 48 onto the drive roll carrier 54.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A wire feeder, comprising:
   a drive roll carrier, comprising:
   a hub;
   an engagement feature positioned circumferentially about the hub, wherein the engagement feature is configured to engage a drive roll and to urge rotation of the drive roll about a rotational axis; and
   a retainer comprising a retaining feature extending radially outward from the retainer, wherein the retainer is configured to be selectively locked into one of a first position relative to the hub and a second position relative to the hub,
   wherein the retaining feature and the engagement feature are substantially axially aligned in the first position to allow the drive roll to pass between the retaining feature and the engagement feature when the retainer is in the first position, and the retaining feature and the engagement feature are not axially aligned in the second position to secure the drive roll when the retainer is in the second position.

2. The wire feeder of claim 1, wherein the retainer is configured to be transitioned between the first and second positions without being translated along the hub in a direction of the rotational axis.

3. The wire feeder of claim 1, wherein the drive roll carrier comprises a plurality of engagement features, and the retainer comprises a plurality of retaining features.

4. The wire feeder of claim 1, wherein the hub is integral with a gear.

5. The wire feeder of claim 1, wherein the retainer is configured to be transitioned between the first and second positions via rotation of the retainer about the hub.

6. The wire feeder of claim 1, wherein the retainer is configured to be rotated between the first and second positions only in response to an external force.

7. The wire feeder of claim 1, comprising a retaining element configured to block the retainer from translating along the hub in a direction of the rotational axis.

8. The wire feeder of claim 1, wherein the retainer is removable from the wire feeder without removing the hub from the wire feeder.

9. The wire feeder of claim 1, wherein the retainer and the hub comprise complementary indexing features configured to selectively lock the retainer into the first and second positions.

10. The wire feeder of claim 9, wherein the complementary indexing features comprise at least one detent and at least one indentation.

11. The wire feeder of claim 10, wherein the at least one detent comprises a semi-spherical detent.

12. The wire feeder of claim 10, wherein the at least one detent comprises a semi-cylindrical detent.

13. The wire feeder of claim 10, wherein the at least one indentation comprises a groove.

14. The wire feeder of claim 9, wherein the complementary indexing features of the retainer are arranged circumferentially along an inner circumference of the retainer at a constant angle relative to each other, and wherein the complementary indexing features of the hub are arranged circumferentially along an outer circumference of the hub at a constant angle relative to each other.

15. A drive roll carrier, comprising:
    a hub;
    an engagement feature positioned circumferentially about the hub, wherein the engagement feature is configured to engage a drive roll and to urge rotation of the drive roll about a rotational axis; and
    a retainer comprising a retaining feature extending radially outward from the retainer;
    wherein the retainer is configured to be selectively locked into an indexed position relative to the hub, wherein the retaining feature and the engagement feature are aligned in the indexed position to allow insertion or removal of the drive roll relative to the engagement feature.

16. The drive roll carrier of claim 15, wherein the retainer is configured to be transitioned into and out of the indexed position without being translated along the hub in a direction of the rotational axis.

17. The drive roll carrier of claim 15, wherein the retainer comprises a first indexing feature disposed along an inner circumference of the retainer, the hub comprises a second indexing feature disposed along an outer circumference of the hub, and the first and second indexing features are configured to interface for selectively locking the retainer in the indexed position.

18. The drive roll carrier of claim 17, wherein the first and second indexing features of the retainer and the hub comprise a detent and an indentation, wherein the detent is configured to be captured in the indentation.

19. The drive roll carrier of claim 15, wherein the retainer cannot rotate relative to the hub without being urged by an external force.

20. The drive roll carrier of claim 15, wherein the hub is integral with a gear.

* * * * *